US009439107B2

(12) United States Patent
Jha

(10) Patent No.: US 9,439,107 B2
(45) Date of Patent: Sep. 6, 2016

(54) HANDOVER IN A WIRELESS TELECOMMUNICATION NETWORK ENVIRONMENT

(71) Applicant: CISCO TECHNOLOGY, INC., San Jose, CA (US)

(72) Inventor: Atul Jha, Bangalore (IN)

(73) Assignee: CISCO TECHNOLOGY, INC., San Jose, CA (US)

( * ) Notice: Subject to any disclaimer, the term of this patent is extended or adjusted under 35 U.S.C. 154(b) by 52 days.

(21) Appl. No.: 14/174,044

(22) Filed: Feb. 6, 2014

(65) Prior Publication Data

US 2015/0223117 A1    Aug. 6, 2015

(51) Int. Cl.
*H04W 36/00*    (2009.01)

(52) U.S. Cl.
CPC ..... *H04W 36/0016* (2013.01); *H04W 36/0033* (2013.01)

(58) Field of Classification Search
None
See application file for complete search history.

(56) References Cited

U.S. PATENT DOCUMENTS

| 2009/0047965 | A1 | 2/2009 | Godin et al. | |
|---|---|---|---|---|
| 2010/0315974 | A1* | 12/2010 | Richardson et al. | 370/254 |
| 2013/0079018 | A1 | 3/2013 | Teyeb et al. | |
| 2014/0066084 | A1* | 3/2014 | Paladugu | H04W 28/24 455/452.2 |
| 2014/0370898 | A1* | 12/2014 | Saily | H04W 48/16 455/436 |
| 2015/0282210 | A1* | 10/2015 | Li | H04W 74/004 455/436 |

FOREIGN PATENT DOCUMENTS

WO    2009/097906    8/2009

OTHER PUBLICATIONS

Alcatel-Lucent, "The LTE Network Architecture: A Comprehensive Tutorial" Strategic White Paper, Dec. 2009, 26 pages; http://www.cse.unt.edu/~rdantu/FALL_2013_WIRELESS_NETWORKS/LTE_Alcatel_White_Paper.pdf.
European Telecommunications Standards Institute, LTE: Evolved Universal Terrestrial Radio Access Network (E-UTRAN); X2 Application Protocol (X2AP) (3GPP TS 36.423 version 8.3.0 Release 8), ETSI TS 136 423 V8.3.0 (Nov. 2008), 86 pages; http://www.etsi.org/deliver/etsi_ts/136400_136499/136423/08.03.00_60/ts_136423v080300p.pdf.

* cited by examiner

*Primary Examiner* — Justin Lee
(74) *Attorney, Agent, or Firm* — Patent Capital Group

(57)    ABSTRACT

An example method for handover in a wireless telecommunication network environment is provided and includes receiving a handover request from a first Evolved Universal Terrestrial Radio Access Network (E-UTRAN) nodeB (eNB) for an application executing at a user equipment (UE) in a long term evolution (LTE) wireless network environment, the handover request being sent by the first eNB to a second eNB, determining, at the second eNB, whether substantially all mandatory bearers required by the application can be accepted at the second eNB, and responding by the second eNB to the first eNB with a handover preparation failure message when substantially all mandatory bearers required by the application cannot be accepted at the second eNB. In specific embodiments, the handover request includes a list of substantially all mandatory bearers required by the application.

20 Claims, 4 Drawing Sheets

HANDOVER IN A WIRELESS TELECOMMUNICATION NETWORK ENVIRONMENT

TECHNICAL FIELD

This disclosure relates in general to the field of communications and, more particularly, to handover in a wireless telecommunication network environment.

BACKGROUND

Long Term Evolution (LTE), marketed as 4G LTE, is a standard for wireless communication of high-speed data for mobile phones and data terminals based on the Global System for Mobile Communications (GSM)/Enhanced Data rates for GSM Evolution (EDGE) and Universal Mobile Telecommunications System (UMTS)/High Speed Packet Access (HSPA) network technologies. The LTE and related standards are developed by 3rd Generation Partnership Project (3GPP). LTE uses Evolved Universal Terrestrial Radio Access Network (E-UTRAN) radio access network standard for LTE's air interface system. The 3GPP infrastructure provides wired or wireless connections among communicating intermediate stations, called E-UTRAN nodeBs (eNBs). LTE is accompanied by an evolution of non-radio aspects under System Architecture Evolution (SAE), which includes the Evolved Packet Core (EPC) network. LTE and SAE together comprise the Evolved Packet System (EPS).

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF EXAMPLE EMBODIMENTS

Overview

An example method for facilitating handover in a wireless telecommunication network environment is provided and includes receiving a handover request (e.g., request to move handling of a packet data network (PDN) connection, which is an association, represented by a unique IP address, between a user equipment (UE) and the PDN) from a first eNB for an application executing at a UE in a LTE wireless network environment, the handover request being sent by the first eNB to a second eNB, determining, at the second eNB whether substantially all mandatory bearers required by the application can be accepted at the second eNB, and responding by the second eNB to the first eNB with a handover preparation failure message when substantially all mandatory bearers required by the application cannot be accepted at the second eNB. As used herein, the term "bearer" comprises an Internet Protocol (IP) packet flow with a predetermined quality of service (QoS). The term "mandatory bearer" comprises a bearer that is required by a specific application executing and using the PDN connection at the UE (for example, to maintain a specific QoS).

Example Embodiments

Figure 1:
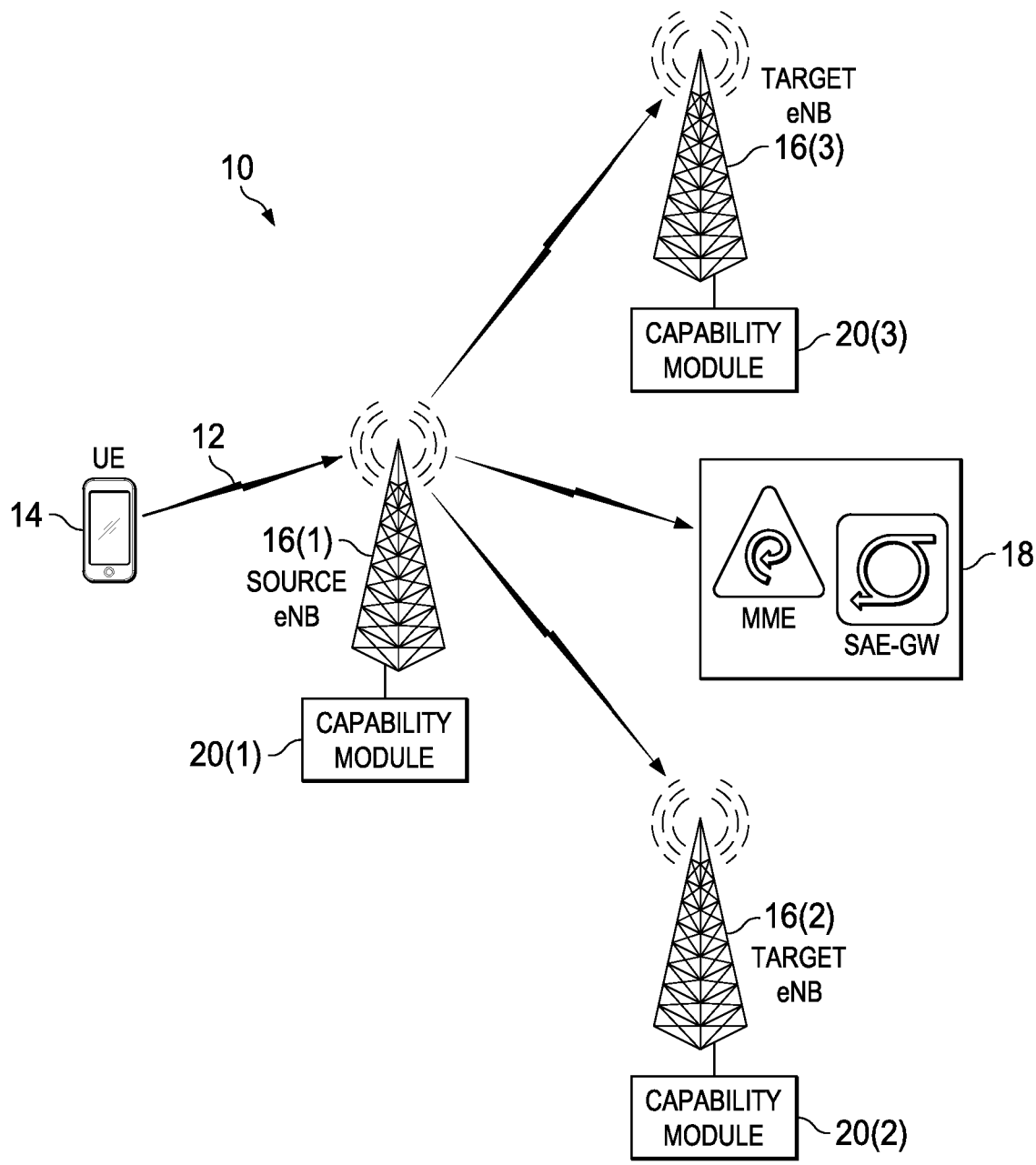
FIG. 1 is a simplified block diagram illustrating a communication system for facilitating handover in a wireless telecommunication network environment.

Turning to FIG. 1, FIG. 1 is a simplified block diagram illustrating a communication system 10 for facilitating handover in a wireless telecommunication network environment in accordance with one example embodiment. FIG. 1 illustrates a LTE network 12 comprising a UE 14 in wireless communication with an eNB 16(1) using LTE communication protocols. A PDN connection at UE 14 using the wireless communication in network 12 may be established through a mobility management entity (MME) and system architecture evolution (SAE) gateway (GW) 18, which communicates appropriately with eNBs 16(1)-16(3). As UE 14 moves from one cell to another cell in network 12, UE 14 may stop communication with eNB 16(1) and commence communication with eNB 16(2) or 16(3), depending on wireless signal properties (e.g., signal strength, QoS, etc.).

According to various embodiments, eNBs 16(1)-16(3) may execute operations configured to reduce latency during handover from source eNB 16(1) to target eNB 16(2) or 16(3). As used herein, the term "handover" comprises a process (e.g., series of operations) used to hand over a UE (e.g., UE 14) from a source eNB (e.g., eNB 16(1)) to a target eNB (e.g., eNB 16(2) or 16(3)). In an example embodiment, extra information associated with mandatory bearers for applications required by UE 14 may be provided from source eNB 16(1) to target eNB 16(2) and 16(3) in a handover request message. The target eNBs 16(1) and 16(2) can respond with a handover preparation failure message if the mandatory bearers are not acceptable, and with a handover request acknowledgement message if the mandatory bearers are acceptable.

For purposes of illustrating the techniques of communication system 10, it is important to understand the communications that may be traversing the system shown in FIG. 1. The following foundational information may be viewed as a basis from which the present disclosure may be properly explained. Such information is offered earnestly for purposes of explanation only and, accordingly, should not be construed in any way to limit the broad scope of the present disclosure and its potential applications.

In a cellular network environment, mobility management typically involves serving cell monitoring and evaluation, cell search and measurement reporting, and mobility decision and execution. The serving cell quality is monitored and evaluated on a periodic basis to sustain service quality over an acceptable threshold. If the service quality (e.g. in terms of received signal strength or energy consumption) falls below a policy-defined threshold, cell search and measurement reporting is triggered. The cell search and measuring procedure can be either network-configured or UE based depending on a radio interface standard, a current UE state (e.g. idle or connected), UE capabilities, and other factors. In both cases, a handover (HO) decision entity incorporates derived signal quality measurements (e.g., from the UE) to decide to move the UE to another cell, for example, based on various criteria including performance measures such as signal quality measures (e.g., received signal strength), user mobility measures (e.g. speed, direction, etc.), and the UE's energy consumption.

The HO procedure typically involves the following operations. A source eNB, which currently serves the UE, configures the UE measurement procedures (e.g., according to area restriction information). Measurements provided by the source eNB may assist in controlling the UE's connection mobility. The UE is triggered to send a measurement report to the source eNB; based on the measurement report and other information (e.g., radio resource management (RRM), UE History etc.) the source eNB makes a decision to hand off the UE to another target eNB. The source eNB issues a handover request message to the target eNB passing appropriate information to prepare the HO at the target eNB.

Typical HO mechanisms include certain information for the handover in the handover request message, such as UE X2/S1 context and EPC signaling context reference at source eNB (e.g., to enable the target eNB to address the source eNB and evolved packet core (EPC) network), radio resource control (RRC) context, E-UTRAN Radio Access Bearer (E-RAB) context and physical layer identifier of the source cell and Media Access Control (MAC) for Quality of Service (QoS) profiles and addressing information.

EPS uses a concept of EPS bearers to route IP traffic in the network to the UE. EPS provides a user with IP connectivity to the PDN for accessing the Internet and for running applications such as Voice Over IP (VoIP). The EPS bearer is typically associated with a QoS. Multiple bearers can be established for a user, for example, to provide different QoS streams or connectivity to different PDNs. In a typical case, multiple applications may be executing in the UE simultaneously, each one having different quality of service requirements. For example, a user might be engaged in a VoIP call while simultaneously performing web browsing. VoIP has more stringent requirements for QoS in terms of delay and delay jitter than web browsing, whereas web browsing requires a much lower packet loss rate. A VoIP bearer would provide the necessary QoS for the voice call, while a best-effort bearer would be suitable for the web browsing. In the access network (e.g., network comprising eNBs), it is the responsibility of the eNB to ensure the appropriate QoS for a bearer over the radio interface.

Each bearer has an associated QoS class identifier (QCI), and an Allocation and Retention Priority (ARP). Each QCI is characterized by priority, packet delay budget and acceptable packet loss rate. The QCI label for a bearer determines how it is handled at the eNB. For example, a packet with higher priority as specified in the QCI may be scheduled before a packet with lower priority. The ARP of the bearer is used for admission control (e.g., to decide whether or not the requested bearer should be established in case of radio congestion). LTE uses E-UTRAN Radio Access Bearer (E-RAB) (which refers to concatenation of an S1 bearer and a corresponding radio bearer) to route packets of the EPS bearer between a S-GW and the UE. The task of admission control at eNBs is to decide whether or not to establish a new E-RAB.

Admission control may be performed by the target eNB to admit or reject the establishment requests for new radio bearers in the handover request message. Generally, admission control algorithms estimate demand for physical resource block (PRB) of service when a bearer establish request is received. The admission control at the eNBs typically takes into account overall resource situation in E-UTRAN, and E-RAB QoS requirements of the handover request in light of QoS requirements of existing sessions. For example, dependent on received E-RAB QoS information, to increase the likelihood of a successful HO, the target eNB may determine if sufficient resources (e.g., memory, processing, etc.) can be granted to the UE. Different applications require different resources at the eNBs; for example, conversational class service represents real-time traffic such as VoIP, streaming class service represents another kind of real-time traffic such as online video, and best effort class service represents non-real-time traffic, such as file transfer protocol (FTP) downloads; each service class necessitates different resource allocation, for example, in terms of interfaces, memory buffers and processing queues. The target eNB configures the required resources according to the received E-RAB QoS information and reserves appropriate interfaces and other resources.

The target eNB prepares for HO and sends a handover request acknowledge to the source eNB. Typically, if even one non-guaranteed bit rate (GBR) is accepted at the target eNB, the target eNB sends the handover request acknowledge. The target eNB includes a list of admitted bearers (e.g., SAE Bearers for which resources have been prepared at the target cell) in the handover request acknowledge. The target eNB includes the SAE bearers that have not been admitted in a SAE Bearers Not Admitted List with an appropriate cause value. The handover request acknowledge message also includes a transparent container to be sent to the UE as a RRC message to perform the HO.

When multiple target eNBs are available, the source eNB sends the handover request to the multiple target eNBs. Each target eNB sends the handover request acknowledge if at least one non-GBR bearer is accepted at the target eNB. The source eNB checks the list of accepted bearers, and based on the accepted bearers, chooses a particular target eNB and sends a handover cancel to other target eNBs. Typically, if the mandatory bearers for the relevant applications are not accepted by a specific target eNB, the target eNB is not selected by the source eNB. Thus, at least three messages, namely, handover request, handover request acknowledge and handover cancel are used by the eNBs in the selection/rejection process of a particular target eNB during handover. When the number of UEs and HOs increase, the messages between the source eNBs and target eNBs can add latency in overall handover time, adversely impacting performance of the handover.

Consider a specific example where a voice-over-LTE (Volte) call is being serviced in a LTE network with 3 bearers: bearer-1, (e.g., QoS class of identifier (QCI)-8 default bearer), bearer-2 (e.g., QCI-5 bearer necessary for the Volte call) and bearer-3 (QCI-1 bearer). Assume that a measurement report indicates low signal strength between the phone and the source eNB, and better signal strength with a couple of target eNBs: target eNB1, and target eNB2. If target eNB1 accepts only bearer-1 (but not bearer-2 and bearer-3), target eNB1 would respond with a handover request acknowledgement. The source eNB would likely reject target eNB1 with a handover cancel because the Volte call requires all three bearers. The source eNB may subsequently attempt the handover to target eNB2, and the overall time taken to receive and send the handover messages may adversely impact latency performance indicators.

Communication system 10 is configured to address these issues (and others) in offering a system and method for facilitating handover in a wireless telecommunication network environment. According to embodiments of communication system 10, handover requests of UE 14 from source eNB 16(1) to target eNB 16(2) and 16(3) may include information on mandatory bearers required by the application executing at UE 14. For example, the mandatory bearer information may be carried though an additional bit in the handover requests. Thus, target eNB 16(2) and 16(3) may know apriori (e.g., before handover is accepted or canceled) whether it can accept (e.g., support, admit, process, handle, etc.) all the mandatory bearers listed in the handover request. If even one mandatory bearer is not accepted, a handover preparation failure message may be returned to source eNB 16(1) instead of a handover request acknowledgement. Thus, source eNB 16(1) would not have to make a determination of which target eNBs to reject; additionally, source eNB 16(1) would not have to send one or more handover cancel messages.

In various embodiments, target eNB 16(2) may receive a handover request from source eNB 16(1) for an application executing at UE 14 in a LTE wireless network 12, the handover request being sent by eNB 16(1) to eNB 16(2). The handover request may include a list of all mandatory bearers required by the application. In specific embodiments, a flag in the handover request may be set to indicate a mandatory bearer required by the application. Target eNB 16(2) may determine whether all mandatory bearers required by the application can be accepted at eNB 16(2) and may respond to eNB 16(1) with a handover preparation failure message when all mandatory bearers required by the application cannot be accepted at eNB 16(2). If target eNB 16(2) determines that it can accept all the mandatory bearers required by the application, eNB 16(2) may respond with a handover request acknowledgement. Source eNB 16(1) may decide to handover UE 14 to target eNB 16(2) when eNB 16(1) receives the handover request acknowledgement message.

To elaborate, consider the example of the Volte call discussed previously. The Volte call requires 3 bearers: bearer-1, (e.g., QCI-8 default bearer), bearer-2 (e.g., QCI-5 bearer necessary for the Volte call) and bearer-3 (QCI-1 bearer). Assume that a measurement report indicates low signal strength between the UE 14 and source eNB 16(1), and better signal strength with a couple of target eNBs: target eNB 16(2), and 16(3). According to embodiments of communication system 10, source eNB 16(1) may send a handover request comprising a list of mandatory bearers, including bearer-1, bearer-2, and bearer-3 to target eNBs 16(2) and 16(3). Target eNB 16(2) may determine that it cannot accept bearer-2 and bearer-3 and may respond with a handover preparation failure message. Target eNB 16(3) may determine that it can accept all three bearers, and may respond with a handover request acknowledgement. Source eNB 16(1) may directly start handover with target eNB 16(3) without sending any handover cancel message to target eNB 16(2).

Turning to the infrastructure of communication system 10, the network topology of network 12 can include any number of UEs, eNBs, switches and routers, and other nodes inter-connected to form a large and complex network. A node may be any electronic device, client, server, peer, service, application, or other object capable of sending, receiving, or forwarding information over communications channels in a network. Elements of FIG. 1 may be coupled to one another through one or more interfaces employing any suitable connection (wired or wireless), which provides a viable pathway for electronic communications. Additionally, any one or more of these elements may be combined or removed from the architecture based on particular configuration needs.

Communication system 10 may include a configuration capable of TCP/IP communications for the electronic transmission or reception of data packets in a network. Communication system 10 may also operate in conjunction with a User Datagram Protocol/Internet Protocol (UDP/IP) or any other suitable protocol, where appropriate and based on particular needs. In addition, gateways, routers, switches, and any other suitable nodes (physical or virtual) may be used to facilitate electronic communication between various nodes in network 12.

The example network environment may be configured over a physical infrastructure that may include one or more networks and, further, may be configured in any form including, but not limited to, cellular networks, local area networks (LANs), wireless local area networks (WLANs), VLANs, metropolitan area networks (MANs), wide area networks (WANs), Intranet, Extranet, any other appropriate architecture or system, or any combination thereof that facilitates communications in a network. In some embodiments, a communication link may represent any electronic link supporting a LAN environment such as, for example, cable, Ethernet, wireless technologies (e.g., IEEE 802.11x), ATM, fiber optics, power-line, etc. or any suitable combination thereof. In other embodiments, communication links may represent a remote connection through any appropriate medium (e.g., digital subscriber lines (DSL), telephone lines, T1 lines, T3 lines, wireless, radio, satellite, fiber optics, cable, Ethernet, etc. or any combination thereof) and/or through any additional networks such as a wide area networks (e.g., the Internet).

Note that the numerical and letter designations assigned to the elements of FIG. 1 do not connote any type of hierarchy; the designations are arbitrary and have been used for purposes of teaching only. Such designations should not be construed in any way to limit their capabilities, functionalities, or applications in the potential environments that may benefit from the features of communication system 10. It should be understood that communication system 10 shown in FIG. 1 is simplified for ease of illustration.

In various embodiments, LTE network 12 can include an enterprise network, for example, a cellular network operating within an enterprise context. In other embodiments, LTE network 12 can include a wide area network, and other types of wireless networks. In various embodiments, MME/SAE-GW 18 can include any type of suitable network elements configured to perform the handover operations and other 3GPP functionalities described herein. As used herein, the term "network element" is meant to encompass computers, network appliances, servers, routers, switches, gateways, bridges, load-balancers, firewalls, processors, modules, or any other suitable device, component, element, or object operable to exchange information in a network environment. Moreover, the network elements may include any suitable hardware, software, components, modules, interfaces, or objects that facilitate the operations thereof. This may be inclusive of appropriate algorithms and communication protocols that allow for the effective exchange of data or information. UE 14 may include any type of device capable of communicating with eNBs 16(1)-16(3), including smart phones, laptops, tablets, sensors, servers, and appliances.

In various embodiments, eNBs 16(1)-16(3) comprise hardware connected to network 12 that communicates directly with UE 14, for example similar to a base transceiver station (BTS) in GSM networks, and are responsible for substantially all radio related functions (e.g., radio resource management, header compression, security, etc.). eNBs 16(1)-16(3) may embed its own control functionality, or may use a radio network controller within the broad scope of the embodiments. eNBs 16(1)-16(3) can include one or more chips (e.g., chipset) configured to provide mobile data transfer services according to LTE protocols. eNBs 16(1)-16(3) may be interconnected with each other and with other network elements by suitable interfaces (e.g., with each other by an interface known as "X2;" to the MME by a S1-MME interface; and to the S-GW by a S1-U interface). eNBs 16(1)-16(3) may manage one or more cells within cellular network 12. Note that the various communication for handover between eNBs 16(1)-16(3) described herein may occur over the X2 interface in specific embodiments.

Figure 2:
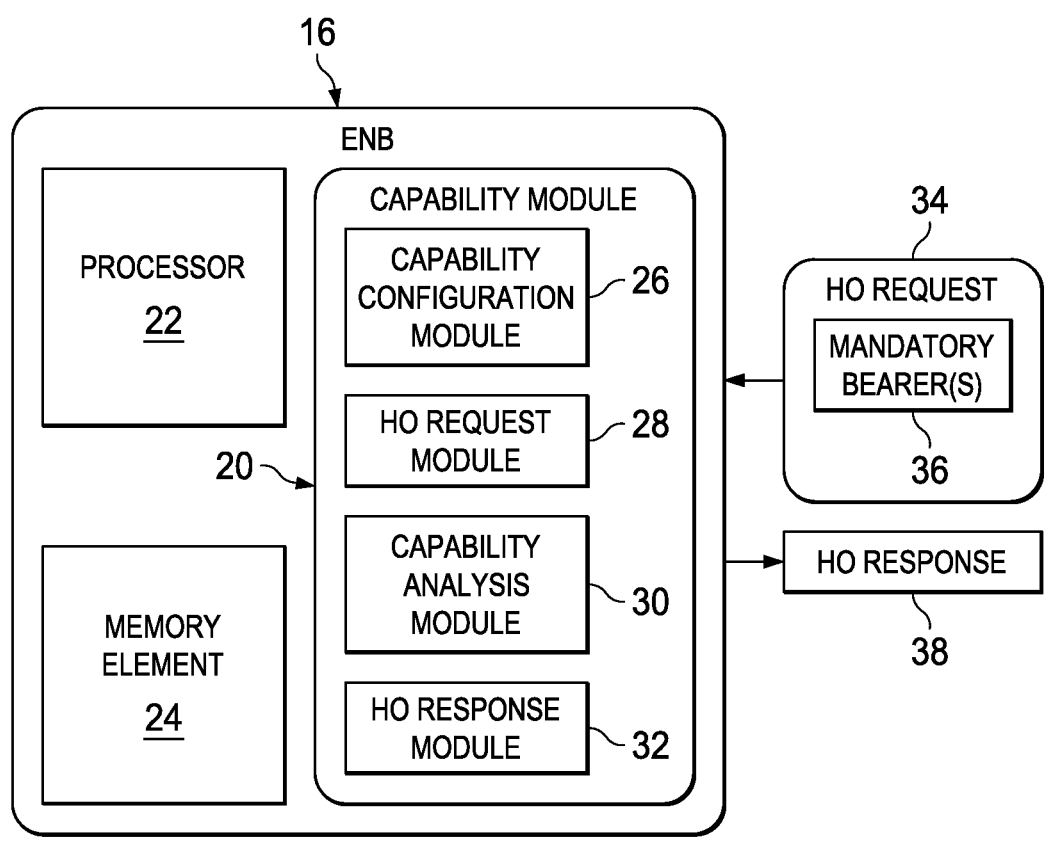
FIG. 2 is a simplified block diagram illustrating example details of an embodiment of the communication system.

Turning to FIG. 2, FIG. 2 is a simplified block diagram illustrating example details of an embodiment of communication system 10. An example eNB 16 may include an example capability module 20, a processor 22 and a memory element 24. Capability module 20 may include a capability configuration module 26, a HO request module 28, a capability analysis module 30, and a HO response module 32. During configuration, capability configuration module 26 may be configured with a list of substantially all bearers with specific QCIs accepted for specific applications (or service classes) under various resource conditions. For example, a maintenance entity (e.g., maintenance software, operator, etc.) may configure eNB 16 with the list of bearers with specific QCIs for various applications or service classes.

During operation, eNB 16 may receive a HO request 34, for example from another eNB (e.g., source eNB). HO request 34 includes at least one indication 36 of mandatory bearer(s) needed for the HO. HO request module 28 may parse HO request message 34 and identify the mandatory bearers listed therein. In specific embodiments, the identification may be facilitated by examining a flag (e.g., a bit) for each listed bearer (e.g., the flag may be set if the bearer is mandatory). In some embodiments, the list of bearers with specific QCIs for accepting the handover request may be pre-configured in appropriate operator configured policies. For example, if bearers with QCI-1, QCI-5, and QCI-2 may be marked mandatory by the operator for a specific application, and handover request 34 includes bearers with QCI-1 and QCI-5, a handover request acknowledgement message may be sent to the source eNB if target eNB 16 can accommodate the bearers with QCI-1 and QCI-5; otherwise, target eNB 16 may send a handover preparation failure message.

Capability analysis module 30 may determine, based on the capability configuration saved or retrieved from capability configuration module 26, whether eNB 16 can accept the mandatory bearers listed in HO request 34. Accordingly, HO response module 32 may generate an HO response 38. For example, if even one of the mandatory bearers is not accepted, HO response 38 may include a handover preparation failure message; if all the mandatory bearers are accepted by eNB 16, HO response 38 may include a handover request acknowledgement. HO response 38 may be transmitted to the sender of HO request 34.

Figure 3:
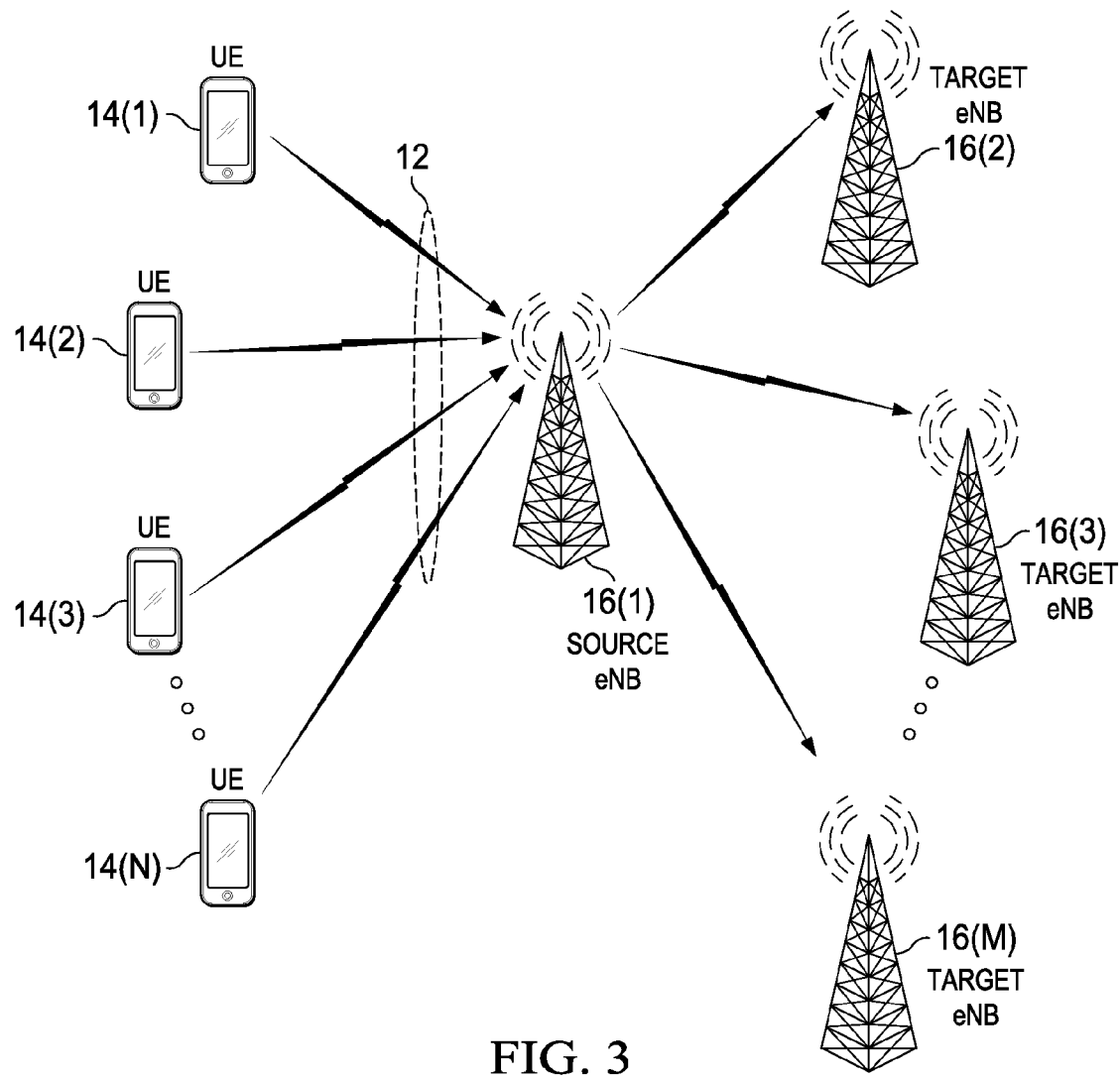
FIG. 3 is a simplified block diagram illustrating yet other example details of an embodiment of the communication system.

Turning to FIG. 3, FIG. 3 is a simplified block diagram illustrating example details of an embodiment of communication system 10. A plurality of UEs 14(1)-14(N) may need a handover substantially simultaneously from eNB 16(1) (source eNB) to one or more other eNBs 16(2)-16(M) (target eNBs) in network 12. For example, UEs 14(1)-14(N) may represent cell phones used by certain passengers in a metropolitan light rail trail; upon alighting at a station, the passengers may disperse in different directions substantially simultaneously, and may need handovers to different eNBs based on their respective travel directions and speeds. In another example, UEs 14(1)-14(N) may represent mobile devices used by employees at a business meeting at a location serviced by a single eNB (e.g., metro cell); when the meeting ends, the employees may disperse in different directions during a specific time interval, and may need handovers during the specific time interval to one or more other eNBs.

It may be desired in such scenarios that source eNB 16(1) manage the multiple handovers in an efficient, timely manner, for example, to minimize call disruptions. Target eNBs 16(2)-16(M) may process the N handover requests from source eNB 16(1) corresponding to each UE 14(1)-14(N). As each handover request indicates mandatory bearers necessary for applications of respective UEs 14(1)-14(N), each target eNB 16(2)-1(M) may separately determine whether the mandatory bearers can be accepted, and may respond accordingly (e.g., send handover preparation failure message if all mandatory bearers cannot be accepted, or send handover acknowledgement message if all mandatory bearers can be accepted). Source eNB 16(1) may thereafter proceed with the handover process with target eNBs 16(2)-16(M) that can accept all mandatory bearers listed in respective handover requests for corresponding applications executing at UEs 14(1)-14(N).

Figure 4:
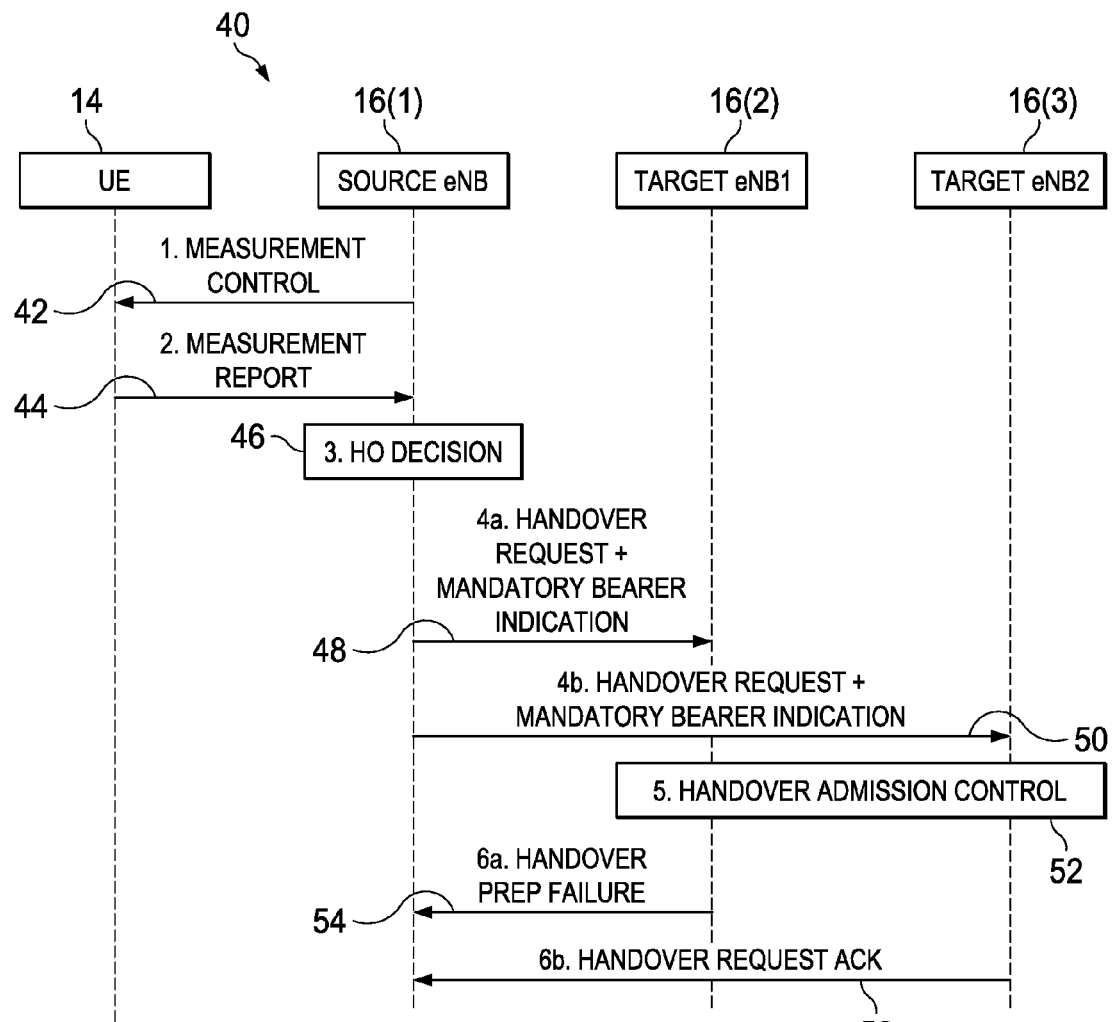
FIG. 4 is a simplified sequence diagram illustrating example operations that may be associated with an embodiment of the communication system.

Turning to FIG. 4, FIG. 4 is a simplified sequence diagram illustrating example operations 40 that may be associated with an embodiment of communication system 10. At 42, source eNB 16(1) may configures UE measurement procedures appropriately, for example, according to area restriction information. Measurements provided by source eNB 16 may assist the function controlling UE 14's connection mobility. At 44, UE 14 may be triggered to send an appropriate measurement report (e.g., according to rules set by system information, specification, etc.). At 46, source eNB 16(1) may make a decision based on the measurement report and RRM information to hand off UE 14 to one of target eNBs 16(2) and 16(3). Accordingly, at 48 and 50, source eNB 16(1) may issue a handover request message to target eNBs 16(2) and 16(3) respectively, passing necessary information, including mandatory bearer information, to prepare the HO at the target side. For example, E-RAB also includes information whether a listed bearer is mandatory. At 52, admission control is performed by target eNBs 16(2) and 16(3) dependent on the received E-RAB QoS information. If all bearers cannot be accepted, for example, at target eNB 16(2), at 54 a handover preparation failure message can be sent to source eNB 16(1) by target eNB 16(2). If all mandatory bearers are accepted, for example, at target eNB 16(3), at 56, a handover request acknowledge message can be sent by target eNB 16(3) to source eNB 16(1).

Subsequently, the handover process may proceed as usual. For example, target eNB 16(3) may generate an RRC message (e.g., RRCConnectionReconfiguration message including the mobilityControlInformation) to be forwarded by source eNB 16(1) towards UE 14. Source eNB 16(1) may perform appropriate integrity protection and ciphering of the RRC message. UE 14 may receive the RRCConnectionReconfiguration message with appropriate parameters (e.g., new C-RNTI, target eNB security algorithm identifiers, and optionally dedicated RACH preamble, target eNB SIBs, etc.) and may be commanded by source eNB 16(1) to perform the HO. UE 14 may not need to delay the handover execution for delivering the HARQ/ARQ responses to source eNB 16(1).

After receiving the RRCConnectionReconfiguration (Handover Confirm) message including the mobilityControlInformation, UE 14 may perform synchronization to target eNB 16(3) and access the target cell via RACH (e.g., following a contention-free procedure if a dedicated RACH preamble was indicated in the mobilityControlInformation, or following a contention-based procedure if no dedicated preamble was indicated). UE 14 may derive target eNB specific keys and configures the selected security algorithms to be used in the target cell. Target eNB 16(3) may responds with UL allocation and timing advance. When UE 14 has successfully accessed the target cell, UE 14 may send a RRCConnectionReconfigurationComplete message (C-RNTI) to confirm the handover, along with an uplink Buffer Status Report, whenever possible, to target eNB 16(3) (e.g., to indicate that the handover procedure is completed for UE 14). Target eNB 16(3) may verify the C-RNTI sent in the RRCConnectionReconfigurationComplete message and can begin sending data to UE 14.

Target eNB 16(3) may send a path switch message to the MME to inform that UE 14 has changed cell. The MME may confirm the path switch message with a path switch acknowledge message. By sending a subsequent UE context release message, target eNB 16(3) may informs success of HO to source eNB 16(1) and trigger release of resources by source eNB 16(1).

Note that in this Specification, references to various features (e.g., elements, structures, modules, components, steps, operations, characteristics, etc.) included in "one embodiment", "example embodiment", "an embodiment", "another embodiment", "some embodiments", "various embodiments", "other embodiments", "alternative embodiment", and the like are intended to mean that any such features are included in one or more embodiments of the present disclosure, but may or may not necessarily be combined in the same embodiments.

Note also that an 'application' as used herein this Specification, can be inclusive of an executable file comprising instructions that can be understood and processed on a computer, and may further include library modules loaded during execution, object files, system files, hardware logic, software logic, or any other executable modules. Furthermore, the words "optimize," "optimization," and related terms are terms of art that refer to improvements in speed and/or efficiency of a specified outcome and do not purport to indicate that a process for achieving the specified outcome has achieved, or is capable of achieving, an "optimal" or perfectly speedy/perfectly efficient state.

In example implementations, at least some portions of the activities outlined herein may be implemented in software in, for example, eNB 16. In some embodiments, one or more of these features may be implemented in hardware, provided external to these elements, or consolidated in any appropriate manner to achieve the intended functionality. The various network elements (e.g., eNBs, UEs) may include software (or reciprocating software) that can coordinate in order to achieve the operations as outlined herein. In still other embodiments, these elements may include any suitable algorithms, hardware, software, components, modules, interfaces, or objects that facilitate the operations thereof.

Furthermore, eNB 16 described and shown herein (and/or their associated structures) may also include suitable interfaces for receiving, transmitting, and/or otherwise communicating data or information in a network environment. Additionally, some of the processors and memory elements associated with the various nodes may be removed, or otherwise consolidated such that a single processor and a single memory element are responsible for certain activities. In a general sense, the arrangements depicted in the FIGURES may be more logical in their representations, whereas a physical architecture may include various permutations, combinations, and/or hybrids of these elements. It is imperative to note that countless possible design configurations can be used to achieve the operational objectives outlined here. Accordingly, the associated infrastructure has a myriad of substitute arrangements, design choices, device possibilities, hardware configurations, software implementations, equipment options, etc.

In some of example embodiments, one or more memory elements (e.g., memory element 24) can store data used for the operations described herein. This includes the memory element being able to store instructions (e.g., software, logic, code, etc.) in non-transitory media, such that the instructions are executed to carry out the activities described in this Specification. A processor can execute any type of instructions associated with the data to achieve the operations detailed herein in this Specification. In one example, processors (e.g., processor 22) could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an erasable programmable read only memory (EPROM), an electrically erasable programmable read only memory (EEPROM)), an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof.

These devices may further keep information in any suitable type of non-transitory storage medium (e.g., random access memory (RAM), read only memory (ROM), field programmable gate array (FPGA), erasable programmable read only memory (EPROM), electrically erasable programmable ROM (EEPROM), etc.), software, hardware, or in any other suitable component, device, element, or object where appropriate and based on particular needs. The information being tracked, sent, received, or stored in communication system 10 could be provided in any database, register, table, cache, queue, control list, or storage structure, based on particular needs and implementations, all of which could be referenced in any suitable timeframe. Any of the memory items discussed herein should be construed as being encompassed within the broad term 'memory element.' Similarly, any of the potential processing elements, modules, and machines described in this Specification should be construed as being encompassed within the broad term 'processor.'

It is also important to note that the operations and steps described with reference to the preceding FIGURES illustrate only some of the possible scenarios that may be executed by, or within, the system. Some of these operations may be deleted or removed where appropriate, or these steps may be modified or changed considerably without departing from the scope of the discussed concepts. In addition, the timing of these operations may be altered considerably and still achieve the results taught in this disclosure. The preceding operational flows have been offered for purposes of example and discussion. Substantial flexibility is provided by the system in that any suitable arrangements, chronologies, configurations, and timing mechanisms may be provided without departing from the teachings of the discussed concepts.

Although the present disclosure has been described in detail with reference to particular arrangements and configurations, these example configurations and arrangements may be changed significantly without departing from the scope of the present disclosure. For example, although the present disclosure has been described with reference to particular communication exchanges involving certain network access and protocols, communication system 10 may be applicable to other exchanges or routing protocols. Moreover, although communication system 10 has been illustrated with reference to particular elements and operations that facilitate the communication process, these elements, and operations may be replaced by any suitable architecture or process that achieves the intended functionality of communication system 10.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method, comprising:
receiving a handover request from a first Evolved Universal Terrestrial Radio Access Network (E-UTRAN) nodeB (eNB) for an application executing at a user equipment (UE) in a long term evolution (LTE) wireless network environment, wherein the handover request is sent by the first eNB to a second eNB and includes an indication of mandatory bearers required by the application for using a packet data network (PDN) connection associated with the handover request, wherein the mandatory bearers comprise a portion of a plurality of bearers, wherein the mandatory bearers are specific to the application, wherein the indication comprises an additional bit in the handover request that is set only for mandatory bearers;
determining, at the second eNB, whether all the mandatory bearers required by the application indicated in the handover request can be accepted at the second eNB, wherein the determining comprises examining the additional bit in the handover request at the second eNB; and
responding by the second eNB to the first eNB with a handover preparation failure message when all the mandatory bearers required by the application cannot be accepted at the second eNB.

2. The method of claim 1, wherein the handover request includes a list of the mandatory bearers required by the application.

3. The method of claim 2, wherein a flag in the handover request is set to indicate that a bearer in the handover request is one of the mandatory bearers required by the application.

4. The method of claim 2, wherein the method further comprises identifying the mandatory bearers, wherein the second eNB is configured with another list of bearers with specific Quality of Service (QoS) class identifiers (QCI) that can be accepted by the second eNB for the application.

5. The method of claim 4, wherein a maintenance entity configures the second eNB with the another list of bearers with specific QCIs that can be accepted by the second eNB for the application.

6. The method of claim 1, wherein the method further comprises responding by the second eNB to the first eNB with a handover request acknowledgement when the mandatory bearers required by the application are accepted at the second eNB.

7. The method of claim 6, wherein the first eNB determines handover of the UE to the second eNB when the first eNB receives the handover request acknowledgement.

8. The method of claim 1, wherein the LTE wireless network comprises an enterprise network.

9. Non-transitory tangible media that includes instructions for execution, which when executed by a processor, is operable to perform operations comprising:
receiving a handover request from a first eNB for an application executing at a UE in a LTE wireless network environment, wherein the handover request is sent by the first eNB to a second eNB and includes an indication of mandatory bearers required by the application for using a PDN connection associated with the handover request, wherein the mandatory bearers comprise a portion of a plurality of bearers, wherein the mandatory bearers are specific to the application, wherein the indication comprises an additional bit in the handover request that is set only for mandatory bearers;
determining, at the second eNB, whether all the mandatory bearers required by the application indicated in the handover request can be accepted at the second eNB, wherein the determining comprises examining the additional bit in the handover request at the second eNB; and
responding by the second eNB to the first eNB with a handover preparation failure message when all the mandatory bearers required by the application cannot be accepted at the second eNB.

10. The media of claim 9, wherein the handover request includes a list of the mandatory bearers required by the application.

11. The media of claim 10, wherein a flag in the handover request is set to indicate that a bearer in the handover request is one of the mandatory bearers required by the application.

12. The media of claim 9, wherein the method further comprises identifying the mandatory bearers, wherein the second eNB is configured with another list of bearers with specific QCIs that can be accepted by the second eNB for the application.

13. The media of claim 12, wherein a maintenance entity configures the second eNB with the another list of bearers with specific QCIs that can be accepted by the second eNB for the application.

14. The media of claim 9, wherein the operations further comprise responding by the second eNB to the first eNB with a handover request acknowledgement when the mandatory bearers required by the application are accepted at the second eNB.

15. The media of claim 14, wherein the first eNB determines handover of the UE to the second eNB when the first eNB receives the handover request acknowledgement.

16. An apparatus, comprising:
a memory element for storing data; and a processor, wherein the processor executes instructions associated with the data, wherein the processor and the memory element cooperate, such that the apparatus is configured for:

receiving a handover request from a first eNB for an application executing at a UE in a LTE wireless network environment, wherein the handover request is sent by the first eNB to a second eNB and includes an indication of mandatory bearers required by the application for using a PDN connection associated with the handover request, wherein the mandatory bearers comprise a portion of a plurality of bearers, wherein the mandatory bearers are specific to the application, wherein the indication comprises an additional bit in the handover request that is set only for mandatory bearers;

determining, at the second eNB, whether all the mandatory bearers required by the application indicated in the handover request can be accepted at the second eNB, wherein the determining comprises examining the additional bit in the handover request at the second eNB; and responding by the second eNB to the first eNB with a handover preparation failure message when all the mandatory bearers required by the application cannot be accepted at the second eNB.

17. The apparatus of claim 16, wherein the handover request includes a list of the mandatory bearers required by the application.

18. The apparatus of claim 17, wherein a flag in the handover request is set to indicate that a bearer in the handover request is one of the mandatory bearers required by the application.

19. The apparatus of claim 16, wherein the method further comprises identifying the mandatory bearers, wherein the second eNB is configured with another list of bearers with specific QCIs that can be accepted by the second eNB for the application.

20. The apparatus of claim 19, wherein a maintenance entity configures the second eNB with the another list of bearers with specific QCIs that can be accepted by the second eNB for the application.

* * * * *